United States Patent Office 3,398,127
Patented Aug. 20, 1968

3,398,127
PHOSPHORUS CONTAINING POLYMERS AND COPOLYMERS
Carlhans Süling, Leverkusen, and Karl-Erwin Schnalke, Cologne-Flittard, Germany, assignors to Farbenfabriken Bayer Aktiengesellschaft, Leverkusen, Germany, a corporation of Germany
No Drawing. Filed Mar. 21, 1966, Ser. No. 535,702
Claims priority, application Germany, May 24, 1965, F 46,134
12 Claims. (Cl. 260—79.3)

ABSTRACT OF THE DISCLOSURE

Phosphorus containing polymers and copolymers from phosphoric acid diester-(N-sulfonyl)-amides containing at least one polymerizable carbon-carbon double bond useful as ion exchange resins, soil improving agents, crosslinking agents, dispersing agents and for making shaped articles.

---

Object of this invention are novel phosphorus containing polymers and copolymers. These polymers contain phosphoric acid diester-(N-sulfonyl)-amides, which in the monomeric state contain at least one polymerizable carbon-carbon double bond as recurring structural units. In the case of copolymers they contain other structural units as well, which are derived from polymerizable vinyl and vinylidene compounds.

A further object of the invention is a process for preparing these polymers. This process comprises generally speaking polymerizing phosphoric acid diester-(N-sulfonyl)-amides which contain at least one polymerizable carbon-carbon double bond in the molecule. This polymerization may be carried out in the presence of other polymerizable vinyl compounds to form copolymers. The polymerization can be carried out in bulk, in solution, in dispersion and in suspension. Polymerization temperatures are preferable between 0 and 100° C., most preferably between 40 and 60° C.

The content of phosphoric-acid-diester-(N-sulfonyl)-amide groups of the polymers and especially of the copolymers of this invention may vary considerably. Those compounds which contain only few phosphoric-acid-diester-(N-sulfonyl)-amide groups, e.g. from 0.5 to 15% are very suitable for producing shaped articles, e.g. filaments, foils, films, fibres, which are very easily dyeable. Copolymers having a high content of acidic groups, e.g. from 15 to 48% and homopolymers are useful as ion exchange resins, soil improving agents, cross-linking agents for other polymers and as dispersing agents.

Phosphoric acid diester-(N-sulphonyl)-amides which contain at least one polymerizable carbon-carbon double bond in the molecule include, for example, compounds of the following general formula:

$$R^1-\underset{R^2}{\underset{|}{C}}=C-\underset{}{\overset{O}{\overset{\|}{C}}}-\underset{}{\overset{R^3}{\overset{|}{N}}}-A-SO_2-\underset{}{\overset{R^4}{\overset{|}{N}}}-\overset{O}{\overset{\uparrow}{P}}-(OR^5)_2$$

I

In this formula, $R^1$, $R^2$, $R^3$ and $R^4$ represent hydrogen or an alkyl radical, preferably $C_1$- to $C_6$-alkyl, $R^5$ an alkyl radical preferably $C_1$- to $C_6$-alkyl or an aryl radical, preferably a phenyl radical, and A represents an alkylene radical, preferably $C_1$- to $C_6$-alkylene or an arylene radical, preferably a phenylene radical.

These compounds can be obtained by reacting phosphoric acid diester-(N-aminosulphonamides), which are amines, e.g. of the following formula:

$$H-\underset{}{\overset{R^3}{\overset{|}{N}}}-A-SO_2-\underset{}{\overset{R^4}{\overset{|}{N}}}-\overset{O}{\overset{\uparrow}{P}}-(OR^5)_2$$

II in which $R^3$, $R^4$, $R^5$ and A have the meanings given above, with reactive derivatives of unsaturated carboxylic acids, e.g. of the following formula:

$$R^1-\underset{R^2}{\underset{|}{C}}=\underset{}{\overset{H}{\overset{|}{C}}}-\overset{O}{\overset{\|}{C}}-X$$

in which $R^1$ and $R^2$ have the meanings given above and X represents a halogen atom such as chlorine or a radical of the following type:

$$R^1-\underset{R^2}{\underset{|}{C}}=\underset{}{\overset{H}{\overset{|}{C}}}-\overset{O}{\overset{\|}{C}}-O-\text{ (}R^1\text{ and }R^2\text{ are as defined above)}$$

The two components are preferably reacted in about equivalent quantities in acetic acid solution, the product is separated by acidifying with hydrochloric acid, and it is then crystallized, e.g. from water. This reaction is carried out at temperatures between −15 and +50° C., preferably between 0° and +25° C. The phosphoric acid diester-(N-sulphonyl-amides), which contain at least one carbon-carbon double bond in the molecule, are new.

The following are examples of phosphoric acid diester-(N-sulphonyl-amides) to be used according to the invention: Phosphoric acid-[N-(4-methacryloylamino-benzenesulphonyl)-amide]-dimethyl ester, phosphoric acid-[N-(3-methacryloylamino-benzenesulphonyl)-amide]-dimethyl ester, phosphoric acid-[N-(3-methacryloylamino-benzenesulphonyl)-amide]-diethyl ester and phosphoric acid-[N-(3-methacryloylamino-benzene-sulphonyl)-amide]-diphenylester.

The amines required for their preparation, for example, of Formula II, can be obtained in known manner, e.g. by the sequence of reactions which is illustrated below with reference to a specific compound:

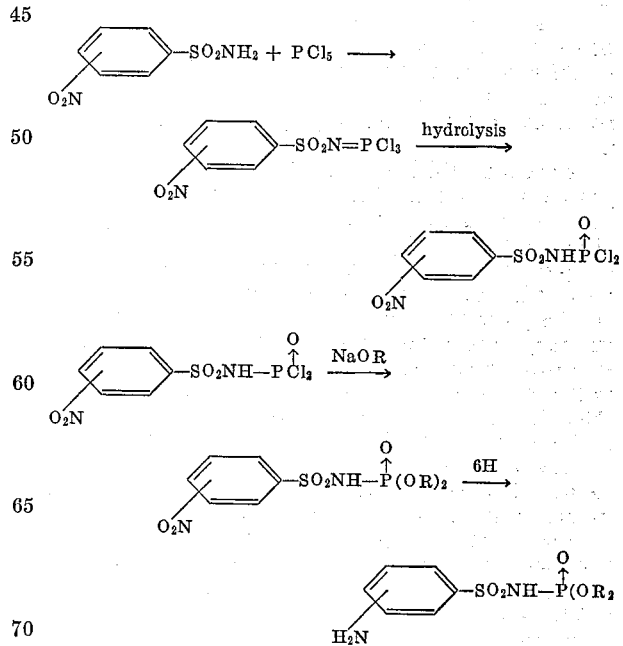

Thus, for example, according to A. V. Kirsanov et al. (Z. obsc. Chim. 27, 2817 (1957)), nitrobenzene sulphonamides can be reacted with phosphorous pentachloride to form nitrobenzene - sulphonyl - imino-phosphoric-acid-trichlorides which can then be converted with phenols or primary, secondary or tertiary alcohols into phosphoric acid-diesters-(N-nitrobenzenesulphonamides) (Z. obsc. Chim. 26, 504 (1956), Izv. Akad. SSSR, 1952, 710) (see also Houben-Weyl, vol. 12/2, 1964, pp. 858, 866, 531). These can be reduced directly to the corresponding amines (Z. obsc. Chim. 28, 1049 (1958)).

Suitable acid derivatives for the reaction are, for example, methacrylic chloride, acrylic chloride, crotonic acid chloride and maleic acid anhydride.

It is also possible to obtain the monomers according to the invention by reacting unsaturated polymerisable sulphonamides with diester chlorides of phosphoric acid. It is further possible to react unsaturated polymerizable sulphonamides, e.g. styrene sulphonamide or vinyl sulphonamide, with phosphorus pentachloride so as to obtain, after saponification of the corresponding sulphonyl-imino-phosphoric acid trichlorides, polymerizable phosphoric acid diester-N-sulphonylamides which are suitable as monomers.

Compounds suitable for the copolymerization with the phosphorus-containing monomers according to the invention are vinyl compounds such as acrylonitrile, acrylic acid esters, preferably acrylic acid alkylesters having 1 to 6 carbon atoms in the alkyl group, e.g. acrylic acid methyl and ethylesters, methacrylic acid esters, preferably alkyl esters, having 1 to 6 carbon atoms in the alkyl radical, e.g. the methyl and ethyl esters, methacrylic acid amides, acrylic acid amides, styrene, and vinyl esters such as vinyl acetate. One may also use vinylidene compounds such as vinylidene chloride, vinyl chloride, methacrylic acid nitrile and diolefines such as butadiene, isoprene and chloroprene. The copolymers according to the invention are to be understood as including copolymers which contain, in addition to the monomers according to the invention, acid comonomers such as acrylic acid or methacrylic acid.

The above-mentioned phosphorus compounds can be copolymerized in any proportions, e.g. 1 to 99% by weight of the phosphorus compound may be used. Particularly valuable products are obtained when 1 to 20% of the phosphorus-containing comonomers are used.

Polymerization of the unsaturated phosphoric acid diester-(N-sulphonylamides) and copolymerization of these monomers with other vinyl compounds can be carried out in bulk, solution, dispersion or emulsion. For emulsion polymerization, the known emulsifiers such as salts of fatty acids and alkyl- or aryl sulphonates and non-ionic emulsifiers such as polyalkylene oxides may be used.

Compounds which are suitable as activators are compounds which are capable of forming radicals, e.g. peroxidic compounds such as hydrogen peroxide, persulphates, alkyl- or aryl peroxides and hydroperoxides. Azo compounds such as azo-diisobutyronitrile may also be used. It is frequently particularly advantageous to carry out the polymerization in an aqueous medium, and for this purpose activating systems known as Redox systems, especially systems which contain persulphate or chlorate as the oxidizing component have been found to be suitable. The monomers according to the invention may be used as such or in the form of their amine- or metal salts.

Homopolymers of the unsaturated phosphoric acid diester-(N-sulphonylamides) are either water-soluble or strongly hydrophilic in character. Products of this type are suitable as soil-improving agents. Copolymers which have low content of phosphoric acid diester-(N-sulphonamide) are used mainly for the production of shaped articles, foils, films, filaments and fibres.

Of special interest are copolymers of acrylonitrile with small proportions of unsaturated phosphoric acid diester-(N-sulphonylamide). Copolymers of this type can be worked up by known processes to form high quality filaments and fibres. Fibres of this type have excellent dyeability with basic dyes. Moreover, these fibres are very pale in the crude state and have a particularly high thermostability. No significant colour change takes place even at temperatures of 160° C. In addition, these polymers have good resistance to factors which promote yellowing, such as alkalies and oxygen. The hydrophilic character of the fibre-forming copolymers is increased by the phosphoric acid ester groups, resulting in an increased moisture adsorption of the polymer. The tendency of filaments and fabrics of such polymers to build up a static charge is thus reduced. This is an important advantage in processing the polymers and in their use in the textile industry.

Example 1

136 g. (0.485 mol) of phosphoric acid dimethylester-[N-(4-aminophenylsulphonyl)-amide] are dissolved in 550 ml. water with the addition of 30 g. of sodium acetate and 30 ml. glacial acid. 52 g. (0.5 mol) methacrylic acid chloride is then added dropwise in the course of one hour at +15° C. and the pH is maintained at 3 by the addition of solid sodium acetate. The solution is then stirred for 45 minutes and then acidified to pH 1 to 1.5 with dilute hydrochloric acid. The precipitated product is separated by suction filtration, washed with water and dried, and after recrystallization from methanol with the addition of some active charcoal, it melts at 192° C.

Calculated: N, 8.02%; P, 8.9%; S, 9.19%. Found: N, 8.00%; P, 8.7%; S, 9.30%.

Example 2

280 g. (1 mol) of phosphoric acid-dimethylester-[N-(3-aminophenyl-sulphonyl)-amide] are dissolved in 1200 ml. water together with 100 g. of sodium acetate. 104.5 g. (1 mol) of methacrylic chloride are then added dropwise in the course of one hour at +10° C. During this time, a pH of 3 is maintained by the addition of solid sodium acetate. The solution is then stirred for one hour and then acidified to pH 1 to 1.5 with dilute hydrochloric acid. The precipitated product is separated by suction filtration, washed with water and recrystallized from water, when it melts at 152° C.

Calculated: C, 41.4%; H, 4.89%; O, 27.6%; N, 8.04%; S, 9.2%; P, 8.9%. Found: C, 41.29%; H, 5.04%; O, 27.45%; N, 8.02%; S, 9.2%; P, 9.05%.

Example 3

200 parts of water, 3 parts of N-sulphuric acid and 1 part of sodium sulphate are placed into a polymerization vessel. The air is displaced by nitrogen, the reaction temperature adjusted to 48° C., and the solutions I, II, III and IV specified below are then introduced over 3 hours. The solutions mentioned are introduced at the same time.

Solution I.—200 parts of water, 0.59 part of potassium persulphate and 3 parts of $NH_2SO_4$
Solution II.—200 parts of water, 0.59 part of sodium pyrosulphite
Solution III.—97 parts of water, 3 parts of 10% soda solution, 1.5 parts of phosphoric acid [N-(4-methacryloylamino-benzenesulphonyl)-amide]-dimethyl ester
Solution IV.—98.5 parts of acrylonitrile A white, granular polymer separates from the reaction mixture after a short time. When all the components have been added the polymerisation mixture is stirred for one hour at 48° C. The polymer is filtered off and dried at 50° C. in a cupboard through which air is circulated. A yield of more than 96% of a copolymer of K-value 85 is obtained which can be worked up into films and fibers which have very good colouring properties.

Example 4

180 parts of water, 80 parts of tertiary butanol, 4 parts of N-sulphuric acid and 1 part of sodium sulphate are placed into a polymerisation vessel. The air is displaced by nitrogen, the reaction temperature is adjusted to 48° C., and the solutions indicated below are simultaneously introduced over 3 hours:

Solution I.—150 parts of water, 0.67 part potassium persulphate, 3 parts N-sulphuric acid
Solution II.—150 parts water, 0.59 part sodium pyrosulphite
Solution III.—98.5 parts water, 1.5 parts phosphoric acid dimethylester-[N-(3 - methacryloylamino-benzene sulphonyl)-amide],0.3 part sodium bicarbonate
Solution IV.—A mixture of 57.5 parts acrylonitrile and 41 parts vinylidene chloride.

A white, granular polymer separates from the reaction mixture after a short time. When all the solutions have been added, the reaction mixture is stirred for a further one hour at 48° C. The polymer is filtered off and dried in a cupboard through which air is circulated 50° C. A yield of more than 82% of a copolymer is obtained which has a K-value of 69.5 and which can be worked up into films and fibres having very good dyeing properties.

Example 5

330 parts of deionized water, 100 parts of vinyl chloride and 2 parts of phosphoric acid-N-[(4-methacryloylaminobenzenesulphonyl)-amide]-dimethyl ester are converted into an emulsion with addition of 2 parts of tertiary sodium phosphate and 2 parts of a long chained aliphatic sulphonic acid ($C_{10}$–$C_{18}$) as sodium salt. The temperature is adjusted to 45° C. after the addition of 0.66 part of potassium persulphate.

Emulsion polymerization sets in after a very short latent period and is completed after 20 hours. A polymer emulsion is obtained which after degasification has a solids content of 23 g. per 100 g. of latex. Clear foils which have a good affinity to basic dyes can be obtained from the precipitated polymer.

What is claimed is:

1. A process for producing phosphorus containing polymers which comprises polymerizing a phosphoric acid diester-(N-sulfonyl)-amide of the formula

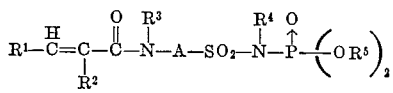

where $R^1$, $R^2$, $R^3$ and $R^4$ are selected from hydrogen and alkyl radicals having 1 to 6 carbon atoms, $R^5$ is selected from alkyl radicals having 1 to 6 carbon atoms and phenyl and A is selected from alkylene radicals having 1 to 6 carbon atoms and phenylene at temperatures between 0 and 100° C. in the presence of a polymerization catalyst.

2. Process according to claim 1 wherein said polymerization catalyst is a radical forming polymerization catalyst.

3. Process according to claim 1 wherein said polymerization is carried out in aqueous emulsion.

4. A process for producing phosphorus containing copolymers which comprises copolymerizing 1 to 99% by weight of a phosphoric acid diester-(N-sulfonyl)-amide of the formula

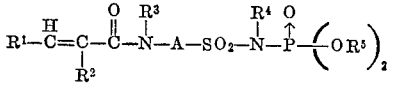

wherein $R^1$, $R^2$, $R^3$ and $R^4$ are selected from hydrogen and alkyl radicals having 1 to 6 carbon atoms, $R^5$ is selected from alkyl radicals having 1 to 6 carbon atoms and phenyl and A is selected from alkylene radicals having 1 to 6 carbon atoms and phenylene and 99 to 1% by weight of another polymerizable vinyl and vinylidene compound at temperatures between 0 and 100° C. in the presence of a polymerization catalyst.

5. Process according to claim 4 wherein said other polymerizable vinyl compound is selected from the group consisting of acrylonitrile, acrylic acid esters, acrylic acid amides, methacrylic acid esters, methacrylic acid amides, styrene, vinyl acetate, vinylidene chloride, vinyl chloride, methacrylic acid nitrile, butadiene, isoprene and chloroprene.

6. A solid addition polymer polymerized through the ethylenically unsaturated bonds of a monomer of the formula

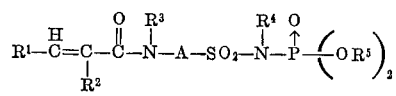

wherein $R^1$, $R^2$, $R^3$ and $R^4$ are selected from hydrogen and alkyl radicals having 1 to 6 carbon atoms, $R^5$ is selected from alkyl radicals having 1 to 6 carbon atoms and phenyl and A is selected from alkylene radicals having 1 to 6 carbon atoms and phenylene.

7. A polymer according to claim 1 wherein said monomer is phosphoric acid-(N-(4-methacryloylaminobenzenesulfonyl)-amide)-dimethylester.

8. A polymer according to claim 6 wherein said monomer is phosphoric acid-(N-(3-methacryloylaminobenzenesulfonyl)-amide)-dimethylester.

9. A copolymer of 1 to 99% by weight of a monomer of the formula

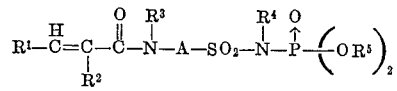

wherein $R^1$, $R^2$, $R^3$ and $R^4$ are selected from hydrogen and alkyl radicals having 1 to 6 carbon atoms, $R^5$ is selected from alkyl radicals having 1 to 6 carbon atoms and phenyl and A is selected from alkylene radicals having 1 to 6 carbon atoms and phenylene, and 99 to 1% by weight of a vinyl compound selected from the group consisting of acrylonitrile, acrylic acid esters, acrylic acid amides, methacrylic acid esters, methacrylic acid amides, styrene, vinyl acetate, vinylidene chloride, vinyl chloride, methacrylic acid nitrile, butadiene, isoprene and chloroprene.

10. A copolymer according to claim 9 wherein said monomer is phosphoric acid [N-(4-methacryloylaminobenzenesulfonic)-amide]-dimethylester and said vinyl compound is acrylonitrile.

11. A copolymer according to claim 9 wherein said monomer is phosphoric acid [N-(3-methacryloylaminobenzenesulfonic)-amide]-dimethylester and said vinyl compound is vinylidene chloride.

12. A copolymer according to claim 9 wherein said monomer is phosphoric acid [N-(3-methacryloylaminobenzenesulfonic)-amide]-dimethylester and said vinyl compound is vinyl chloride.

References Cited

UNITED STATES PATENTS 2,478,378  8/1949  Dickey _____ 260—79.3
3,297,663  1/1967  Herbst et al. _____ 260—79.3

JOSEPH L. SCHOFER, *Primary Examiner.*

D. K. DENENBERG, *Assistant Examiner.*